US012619708B2

(12) United States Patent
Seul et al.

(10) Patent No.: US 12,619,708 B2
(45) Date of Patent: May 5, 2026

(54) PROTECTION OF A MACHINE-LEARNING MODEL

(71) Applicant: INTERNATIONAL BUSINESS MACHINES CORPORATION, Armonk, NY (US)

(72) Inventors: Matthias Seul, Folsom, CA (US); Andrea Giovannini, Zurich (CH); Frederik Frank Flother, Schlieren (CH); Tim Uwe Scheideler, Schoenenberg (CH)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 18/057,266

(22) Filed: Nov. 21, 2022

(65) Prior Publication Data

US 2024/0119137 A1 Apr. 11, 2024

(30) Foreign Application Priority Data

Oct. 6, 2022 (GB) ...................................... 2214676

(51) Int. Cl.
*G06F 21/52* (2013.01)
*G06N 20/00* (2019.01)

(52) U.S. Cl.
CPC ............. *G06F 21/52* (2013.01); *G06N 20/00* (2019.01)

(58) Field of Classification Search
CPC ................................ G06F 21/52; G06N 20/00
See application file for complete search history.

(56) References Cited

U.S. PATENT DOCUMENTS 11,782,966 B1 * 10/2023 Beskales ............... G06F 16/353
707/737
2020/0159924 A1 5/2020 Tran
(Continued)

FOREIGN PATENT DOCUMENTS

GB 2623102 A 4/2024

OTHER PUBLICATIONS

Bai et al., "AI—GAN: Attack-inspired Generation of Adversarial Examples" https://arxiv.org/pdf/2002.02196.pdf, Jan. 12, 2021, pp. 1-5.

(Continued)

*Primary Examiner* — Daniel B Potratz
*Assistant Examiner* — Matthias Habtegeorgis
(74) *Attorney, Agent, or Firm* — Kristofer Haggerty

(57) ABSTRACT

A computer-implemented method or protecting a machine-learning model against training data attacks is disclosed. The method comprises performing an initial training of a machine-learning system with controlled training data, thereby building a trained initial machine-learning model and identifying high-impact training data from a larger training data set than in the controlled training data, wherein the identified individual training data have an impact on a training cycle of the training of machine-learning model, wherein the impact is larger than a predefined impact threshold value. The method also comprises building an artificial pseudo-malicious training data set from the identified high-impact training data and retraining the machine-learning system comprising the trained initial machine-learning model using the artificial pseudo-malicious training data set.

19 Claims, 10 Drawing Sheets

100

102 performing an initial training of a machine-learning system ...

104 identifying high-impact training data from a larger training data set ...

106 building an artificial pseudo-malicious training data set from the identified high-impact training data 108 retraining the machine-learning system ...

(56) References Cited

U.S. PATENT DOCUMENTS

| | | | | |
|---|---|---|---|---|
| 2021/0089819 | A1* | 3/2021 | Tschiatschek | G06F 21/6245 |
| 2021/0110045 | A1 | 4/2021 | Beat | |
| 2021/0157912 | A1 | 5/2021 | Kruthiveti Subrahmanyeswara Sai | |
| 2021/0217524 | A1* | 7/2021 | Vos | G16H 50/20 |
| 2021/0224425 | A1* | 7/2021 | Nasr-Azadani | G06N 5/04 |
| 2021/0279336 | A1 | 9/2021 | Cmielowski | |
| 2021/0287141 | A1 | 9/2021 | Molloy | |
| 2021/0397858 | A1* | 12/2021 | Buerkle | B60W 60/0016 |
| 2022/0269949 | A1* | 8/2022 | Scheideler | G06F 21/56 |
| 2023/0148116 | A1* | 5/2023 | Stokes, III | G06N 3/08 726/23 |
| 2023/0259785 | A1* | 8/2023 | Rudolph | G06N 3/088 |
| 2023/0259820 | A1* | 8/2023 | El-Zehiry | G16H 50/20 706/12 |
| 2023/0274003 | A1* | 8/2023 | Liu | G06N 3/094 726/26 |
| 2023/0297831 | A1* | 9/2023 | Saadi | G06N 3/08 706/25 |

OTHER PUBLICATIONS

Biggio et al., "Wild Patterns: Ten Years After the Rise of Adversarial Machine Learning", https://arxiv.org/pdf/1712.03141.pdf, Jul. 19, 2018, pp. 1-17.

Cai et al., "Active Learning for Classification with Maximum Model Change", https://dl.acm.org/doi/pdf/10.1145/3086820, ACM Transactions on Information Systems, vol. 36, No. 2, Article 15, Publication Date: Aug. 2017, pp. 1-28.

Ede et al., "Adaptive Learning Rate Clipping Stabilizes Learning", arXiv:1906.09060v2 [cs.LG] Jun. 24, 2019, https://arxiv.org/pdf/1906.09060.pdf, pp. 1-7.

Geiping et al., "What Doesn't kill you makes you Robust (er): How to Adversarially Train against data poisoning", thttps://arxiv.org/pdf/2102.13624.pdf, Feb. 17, 2022, pp. 1-25.

Goodfellow et al., "Explaining and Harnessing Adversarial Examples", https://arxiv.org/pdf/1412.6572.pdf, Mar. 20, 2015, pp. 1-11.

Hong et al., "On the Effectiveness of Mitigating Data Poisoning Attacks with Gradient Shaping", https://arxiv.org/pdf/2002.11497.pdf, arXiv:2002.11497v.2[cs.CR], Feb. 27, 2020, pp. 1-18.

https://openai.com/blog/adversarial-example-research/, "Attacking Machine Learning with Adversarial Examples", accessed Oct. 7, 2022, pp. 1-6.

ip.com, "System and Methods for the Automatic Handling of Machine Learning Attacks", https://priorart.ip.com/IPCOM/000267146, Sep. 29, 2021, pp. 1-5.

Kurakin et al., "Adversarial Machine Learning At Scale", https://arxiv.org/pdf/1611.01236.pdf, Feb. 11, 2017, pp. 1-17.

Liu et al., "Rob-GAN: Generator, Discriminator, and Adversarial Attacker", https://openaccess.thecvf.com/content_CVPR_2019/papers/Liu_Rob-GAN_Generator_Discriminator_and_Adversarial_Attacker_CVPR_2019_paper.pdf, 2019 IEEE/CVF Conference on Computer Vision and Pattern Recognition (CVPR), pp. 1-10.

Madry et al, "Towards Deep Learning Models Resistant to Adversarial Attacks", arXiv:1706.0606083v4, Sep. 4, 2019, https://arxiv.org/pdf/1706.06083.pdf, pp. 1-28.

Papernot et al, "Transferability in Machine Learning: from Phenomena to Black-Box Attacks using Adversarial Samples", https://arxiv.org/pdf/1605.07277.pdf, May 24, 2016, pp. 1-13.

Park et al., "On the Effectiveness of Adversarial Training in Defending against Adversarial Example Attacks for Image Classification", file:///C:/Users/2G4409897/Downloads/applsci-10-08079-v2.pdf, Sep. 18, 202,2, pp. 1-16.

Shafahi et al., "Poison Frogs! Targeted Clean-Label Poisoning Attacks on Neural Networks", https://arxiv.org/pdf/1804.00792.pdf, arXiv: 1804.00792v2 [cs.LG] Nov. 10, 2018, pp. 1-18.

Short et al., "Defending Against Adversarial Examples", https://www.osti.gov/servlets/purl/1569514, Sep. 2019, Sandia Report, SAND2019-11748, pp. 1-24.

Sun et al., "Counteracting Adversarial Attacks in Autonomous Driving", https://ieeexplore.ieee.org/document/9256443, 2021, pp. 1-14.

Tabassi et al., "A Taxonomy and Terminology of Adversarial Machine Learning", https://nvlpubs.nist.gov/nistpubs/ir/2019/NIST.IR.8269-draft.pdf, Draft NISTIR 8269, Oct. 2019, pp. 1-36.

* cited by examiner

100

102 performing an initial training of a machine-learning system ...

104 identifying high-impact training data from a larger training data set ...

106 building an artificial pseudo-malicious training data set from the identified high-impact training data 108 retraining the machine-learning system ...

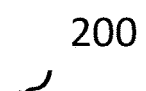
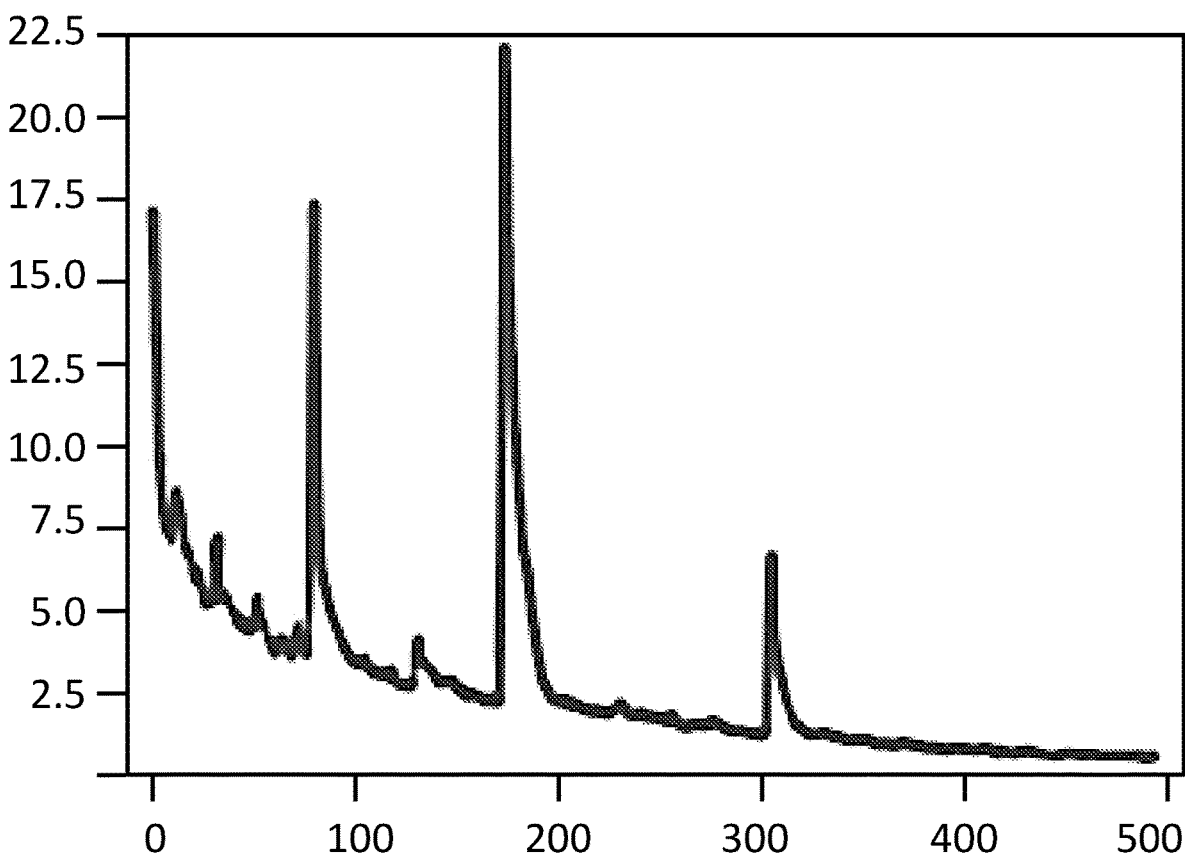
Y-axis: mean square error loss
X-axis: training iterations
FIG. 2

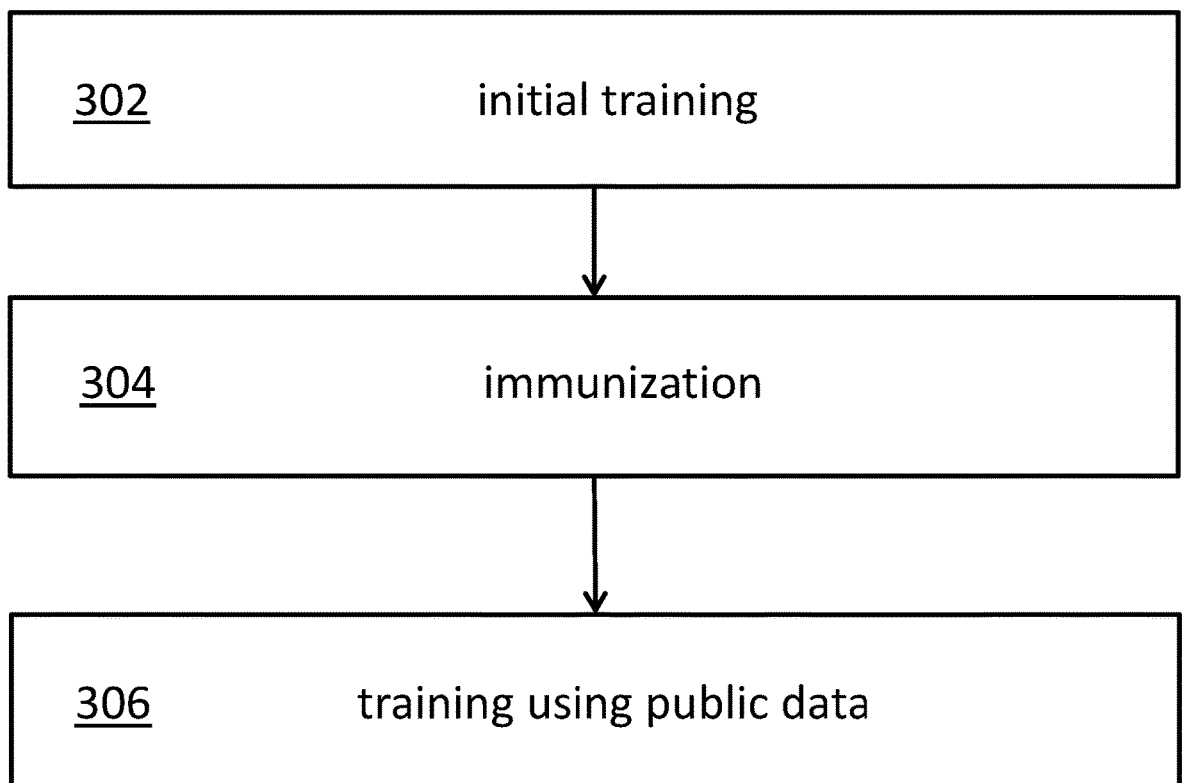
FIG. 3

400

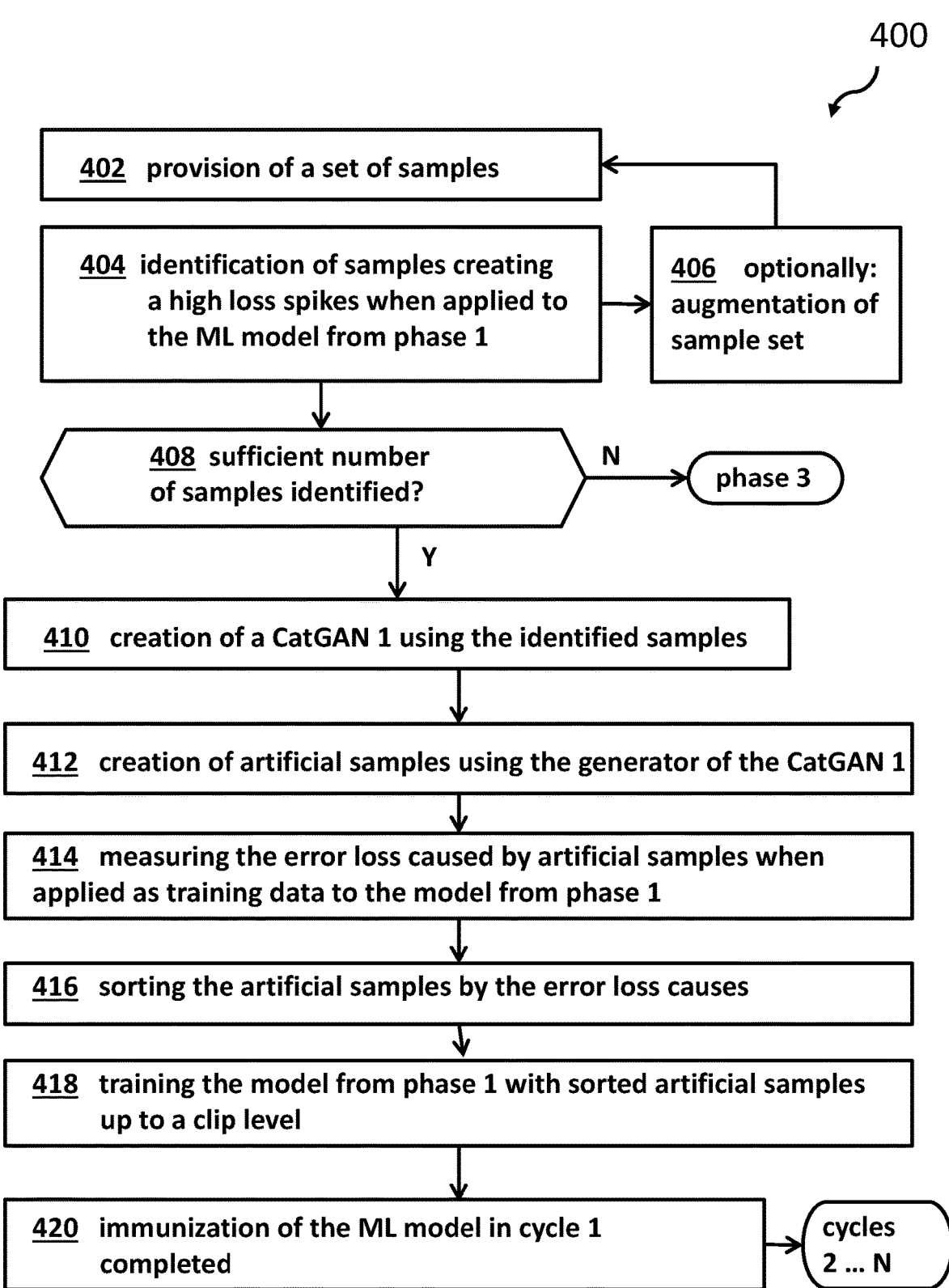

402　provision of a set of samples 404　identification of samples creating a high loss spikes when applied to the ML model from phase 1

406　optionally: augmentation of sample set 408　sufficient number of samples identified?

N phase 3

Y 410　creation of a CatGAN 1 using the identified samples 412　creation of artificial samples using the generator of the CatGAN 1

414　measuring the error loss caused by artificial samples when applied as training data to the model from phase 1

416　sorting the artificial samples by the error loss causes 418　training the model from phase 1 with sorted artificial samples up to a clip level 420　immunization of the ML model in cycle 1 completed cycles 2 ... N

FIG. 4

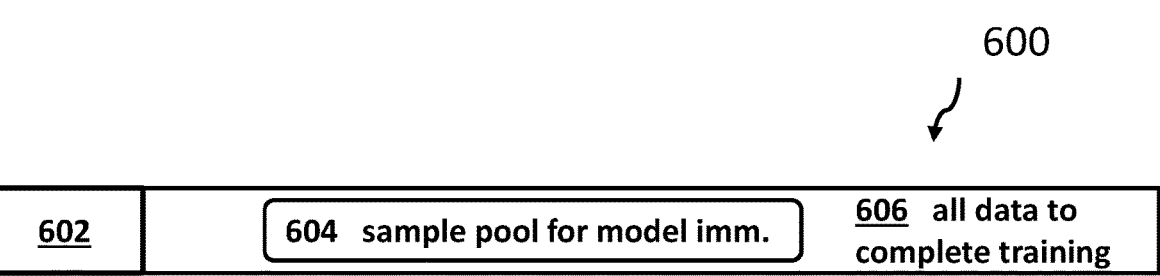
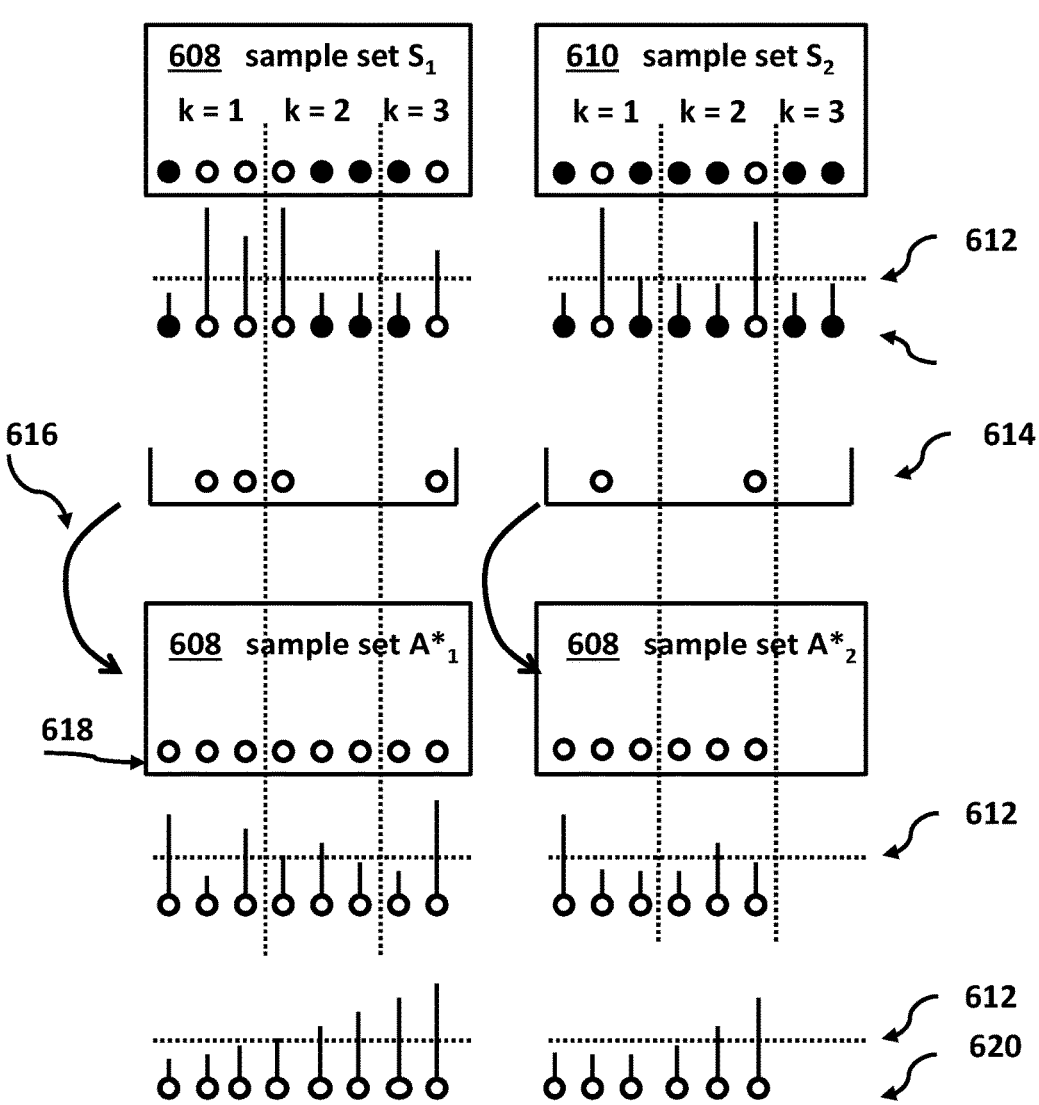
FIG. 6

700

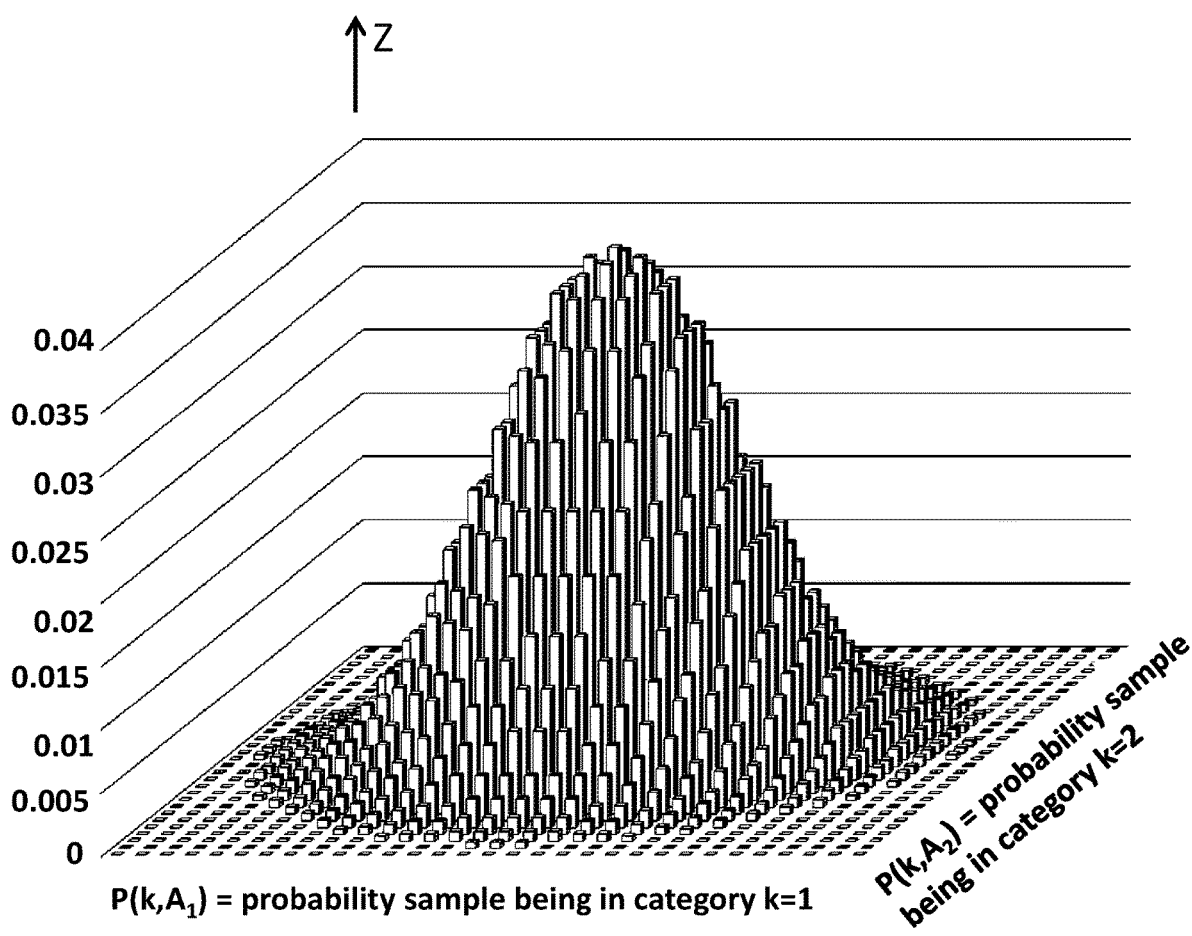
FIG. 8

900

| 906 initial training unit | ⟷ |
| 908 identification system | ⟷ |
| 910 construction unit | ⟷ |
| 912 retraining unit | ⟷ |

914

902
processor(s)

904
memory

1000

PROTECTION OF A MACHINE-LEARNING MODEL

BACKGROUND

Field of the Invention

The invention relates generally to a method and a system for safeguarding a machine-learning process, and more specifically, to a computer-implemented method or protecting a machine-learning model against training data attacks. The invention relates further to a training system for protecting a machine-learning model against training data attacks, and a computer program product.

Related Art

The interest in and usage of solutions using machine-learning (ML) technologies and artificial intelligence in the industry is ever-increasing. As related machine-learning models proliferate, so do attacks on them. One example concerns those ML models whose training data is (at least partly) publicly accessible or worthy attackers were able to obtain unauthorized access to the training data. Complex ML model applications like autonomous driving and language translation depend on large amounts of training data provided by public sources.

Attackers may manipulate the training data, e.g., by introducing additional samples, in such a fashion that humans or analytic systems cannot detect the change in the training data. This represents a serious threat to the behavior and predictions of machine-learning systems because unexpected and dangerous results may be generated. The publication NISTIR 8269 "A Taxonomy and Terminology of Adversarial and Machine-Learning" classifies and names various attack and defense techniques.

Hence, there is a need to counter such attacks to the training data and thus to unintended training of the machine-learning model. In general, increasing the number of trainings tends to increase performance and accuracy of the ML model, and so continues to convergence. However, an adversary can significantly increase the error rate of another ML model by inserting a relatively small amount of maliciously crafted samples. For instance, the article "Active Learning for Classification with Maximum Model Change" quantifies the model change with respect to changes in the training data (compare https://dl.acm.org/doi/pdf/10.1145/3086820).

Moreover, independent of any changes in the training data, there may be learning curves that exhibit instability. For example, "Adaptive Learning Rate Clipping Stabilizes Learning" shows a learning curve with high loss spikes or peaks that excessively disturbed a trainable parameter distribution. This further underscores the potential of an attacker to drastically impact an ML model during the training phase (compare also FIG. 2).

The above-mentioned document NISTIR 8269 names three defense techniques against the described attacks: (i) data encryption and access control to prevent an adversary from injecting training data, which is of course not an option when public data is used for training; (ii) data sanitization requires a separate system for "testing the impact of examples on justification performance"; and (iii) robust statistics "use constraints and regulation techniques to reduce potential distortions".

All of these defense techniques put basically a gate or filter in front of the ML model during training. However, it does not modify the ML model in a way that it becomes sort of immune to malicious data.

There are some disclosures related to a computer-implemented method or protecting a machine-learning model against training data attacks. One example is the document US 2021/0 157 912 A1. It discloses techniques for detecting adverse areas attacks. A machine-learning system processes the input into and output of the ML model using an adversary a detection module that does not contain a direct external interface. Thereby, the adversary a detection module includes a detection model that generates a score indicative of whether the input is adversarial using, e.g., a neural fingerprint technique or a comparison of features extracted by a surrogate ML model to an expected future distribution for the ML model output.

However, also this is only partially addressing the core problem of malicious training data so that the machine-learning itself may comprise a sort of self-defense mechanism against malicious training data. The here proposed approach addresses this problem.

SUMMARY OF THE INVENTION

According to one aspect of the present invention, a computer-implemented method or protecting a machine-learning model against training data attacks may be provided. The method may comprise performing an initial training of a machine-learning system with controlled training data, thereby building a trained initial machine-learning model and identifying high-impact training data from a larger training data set than in the controlled training data, wherein the identified individual training data have an impact on a training cycle of the training of the machine-learning model, wherein the impact is larger than a predefined impact threshold value.

The method may also comprise building an artificial pseudo-malicious training data set from the identified high-impact training data and retraining the machine-learning system comprising the trained initial machine-learning model using the artificial pseudo-malicious training data set.

According to another aspect of the present invention, a related training system for protecting a machine-learning model against training data attacks may be provided. The system may comprise a processor and a memory operationally coupled to the processor. The memory may be adapted for storing program code, which, wherein executed by the processor, may enable the processor to perform an initial training of a machine-learning system with controlled training data, thereby building a trained initial machine-learning model and to identify high-impact training data from a larger training data set than in the controlled training data, wherein the identified individual training data have an impact on a training cycle of the training of the machine-learning model, wherein the impact is larger than a predefined impact threshold value.

The processor may also be enabled to build an artificial pseudo-malicious training data set from the identified high-impact training data and to retrain the machine-learning system comprising the trained initial machine-learning model using the artificial pseudo-malicious training data set.

The proposed computer-implemented method of protecting a machine-learning model against training data attacks may offer multiple advantages, technical effects, contributions and/or improvements:

The method proposed may overcome clearly those prior art technologies that have focused only on attacks during the interference stage and not the text during the training stage.

Generally, two types of attacks may exist: (i) adversarial attacks at inherence time (i.e., runtime) which leads to misclassification to all of the unknown sample containing the malicious pattern but does not affect the ML model; (ii) adversarial attacks at training time, adversely affecting the model.

The prior art has focused on attacks at interference time, i.e., during the training of the model by introducing (manually) selected distorted samples to prepare the ML model, e.g., by feeding ML recognition model for traffic signs with pictures of traffic signs having stickers attached.

In contrast to these prior art techniques, the concept proposed here protects the ML model during training time without using any gate of filters in front. This is possible because the approach here shoes how to intrinsically hardened the ML model. Moreover, the presented method is limited to an explicit adversarial tech strategy using a certain kind of malicious samples, as it automatically searches for weaknesses in a network during training time and remediates the weakness by training the ML model with samples generated specifically for this purpose.

As a result, only a small number of non-malicious training data samples—i.e., save all protected samples—may be required for an initial training. After that, a larger volume of training data and finally also data from public sources may be used for the training in order to meet the training goal, e.g., accuracy of all ML model performance in a variety of settings.

Furthermore, the hardened model may resist the impact of malicious samples without any further intervention or pre-filtering. While the hardening may be overcome with enough, prolonged poisoning of the model, the proposed approach lengthens the time to a change in ML behavior considerably. Additionally, the hardening is part of the ML model itself, making it portable and active wherever the model is deployed. The protection logic and workload thus become an integral part of the model, reducing complexity during use and training and lowering the threshold for implementers to be able to use and train it safely.

Lastly, even if the hardening can be overcome with enough time, the expanded time until that even occurs enables established testing and detection methods to pick up on shifts in behaviors easier and ensures potential poisoning attempts can be detected more consistently.

In the following, additional embodiments of the inventive concept—applicable for the method as well as for the system—will be described.

According to one advantageous embodiment, the method may also comprise extending the training data set to publicly available data, and retrain the machine-learning system comprising the trained initial machine-learning model using the extended training data set. At this point in time additional malicious training data should not have a negative impact on the prediction any longer because the model is "immunized", i.e., even malicious training data will not result in wrong or unexpected predictions. This may be very valuable in case of the underlying machine-learning model is involved in activities concerning human safety, like in systems of autonomous driving.

Accordingly and as a useful embodiment of the method, the re-trained machine-learning model that used publicly available data for the retraining may be used for autonomous driving. This area of technology represents a very competitive industrial environment around the world as the system provided today are still making many decisions/predictions that are irrational. This may cause a very negative trend for the related car manufacturer which may be avoided by the proposed approach.

According to an advanced embodiment, the method may also comprise extending the artificial pseudo-malicious training data set by using a categorical generative adversarial network system (CatGAN) comprising a generator component and a discriminator component, wherein the categorical generative adversarial network has been trained with the artificial pseudo-malicious training data set for generating additional artificial pseudo-malicious training. This may help to proactively generate malicious training data in a controlled way so that the ML model may be hardened against malicious training data introduced by attackers.

According to one permissive embodiment of the method, the machine-learning model may be a categorizing machine-learning model adapted to predict that unknown data belong to one of a plurality of categories. Therefore, not only binary categorizations or classifications may be made by such ML model and the associated system but more fine-grained classifications that may also include a confidence factor as part of the prediction of the ML system that underlies and drives the ML model.

According to another enhanced embodiment of the method, the discriminator component of the CatGAN system may have been trained to predict malicious samples for the artificial pseudo-malicious training data set, wherein the predicted malicious samples may be evenly distributed across the plurality of categories. Hence, a cluster risk for only certain classes or categories of the prediction system may be avoided.

According to another advantageous embodiment of the method, the impact on a training cycle of the training of the machine-learning model may be determined based on an amount value of a utilized training loss function for the training of the machine-learning model. Using this approach, standard machine-learning techniques may also be applied to this new usage field.

According to an interesting embodiment of the method, the high-impact training data are obtained by sorting samples based on their mean square error. However, also other loss function approaches may be used. As a consequence, these potentially malicious data may be used to harden the ML model which can actually and measurably have a powerful influence on the prediction. This approach promises a good immunization of the ML model against unknown malicious training data.

According to an optional but nevertheless interesting embodiment of the method, the controlled training data and the larger training data set may or may not be unchecked with regard to their compromise. Thus, the training personal does not have the burden and risk to make sure that the training data used from public sources do not comprise any malicious samples.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Figure 1:
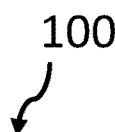

Preferred embodiments of the invention will be described, by way of example only, and with reference to the following drawings:

FIG. 1 shows a block diagram of an embodiment of the inventive computer-implemented method for protecting a machine-learning model against training data attacks.

FIG. 2 shows a diagram of a learning curve with high-loss spikes for the loss-function that excessively perturb a trainable parameter distribution.

FIG. 3 shows a block diagram of a three phase training approach for the hardened ML model.

FIG. 4 shows a block diagram of an embodiment of a first portion of the immunization part of the training of the ML model.

Figure 5:
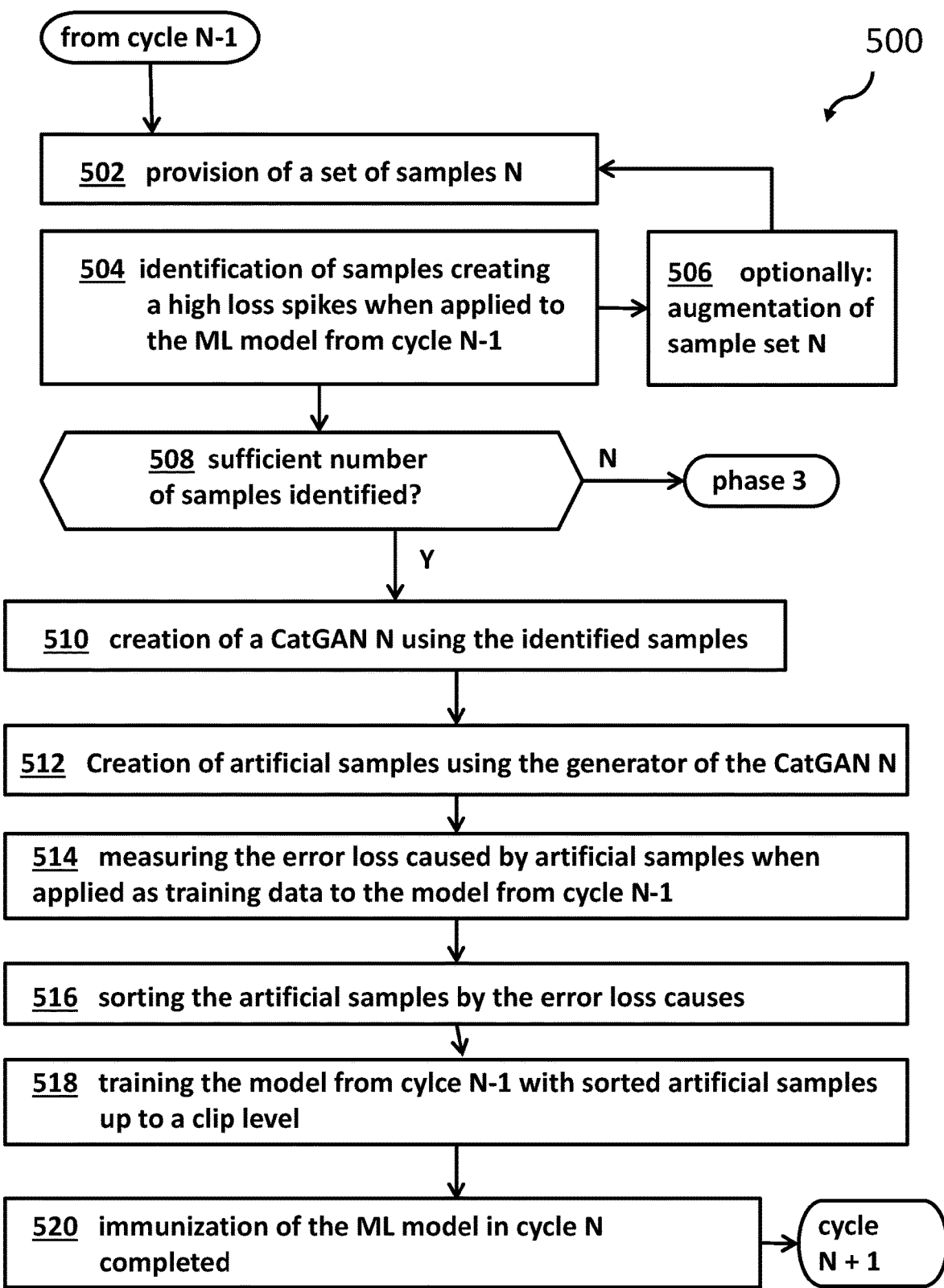

FIG. 5 shows a block diagram of an embodiment of a second portion of the immunization part of the training the ML model.

FIG. 6 shows a block diagram of an embodiment of generating tempered training samples using a CatGAN.

Figure 7:
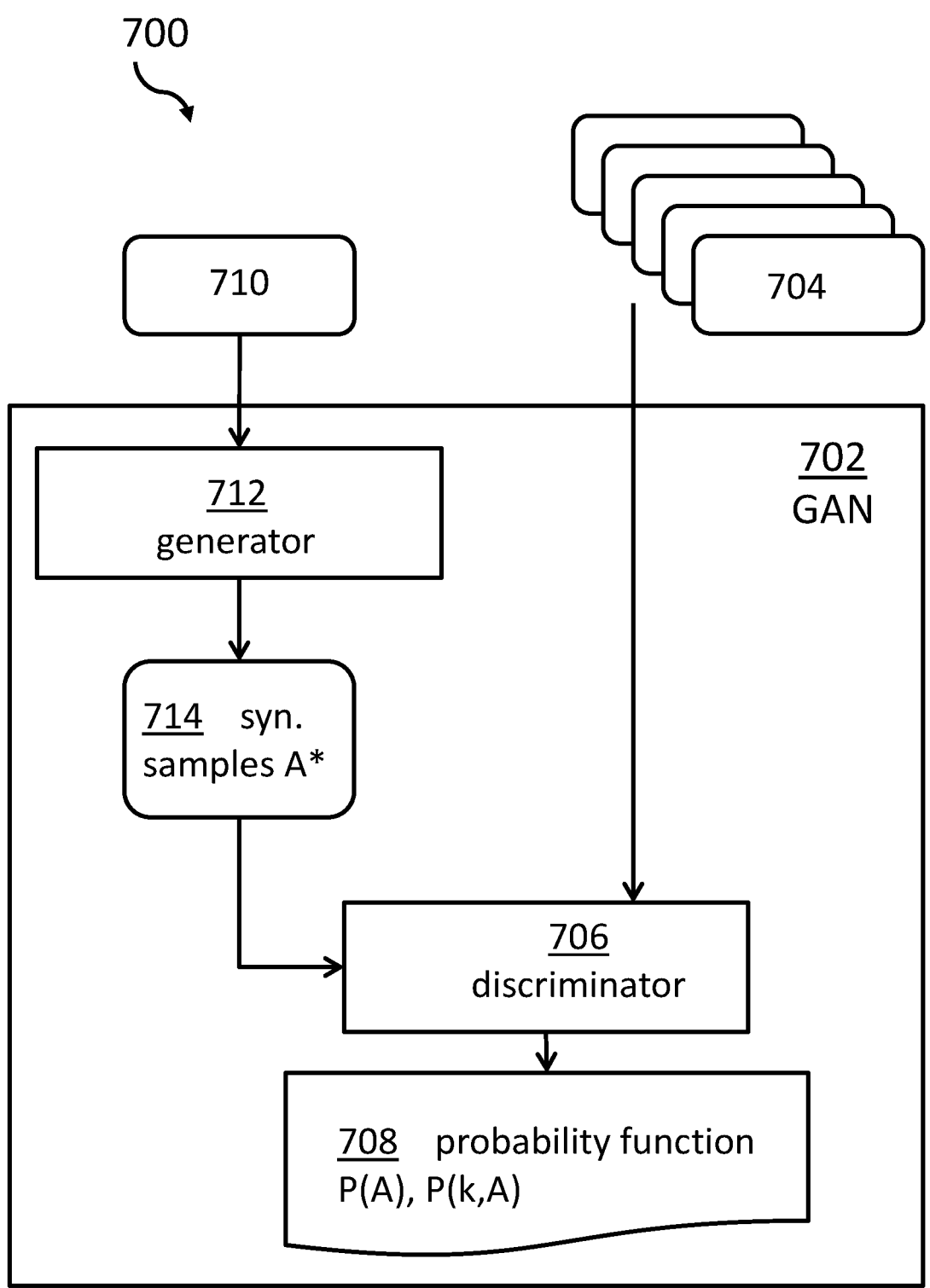

FIG. 7 shows a usage of a CatGAN for a sample creation.

FIG. 8 shows an exemplary distribution of artificial samples distributed over the plurality of categories.

Figure 9:

FIG. 9 shows a block diagram of an embodiment of the training system for protecting a machine-learning model against training data attacks.

Figure 10:
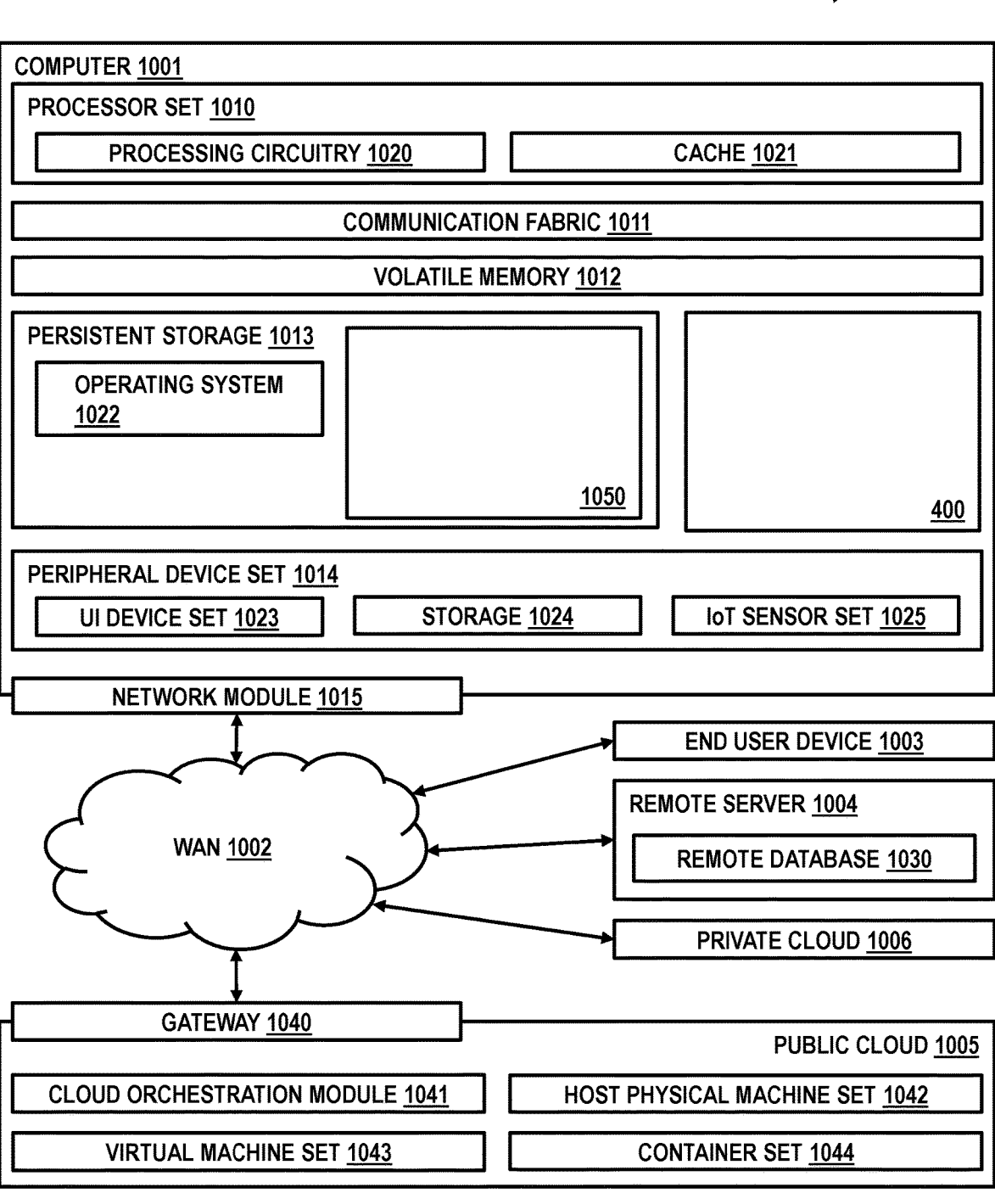

FIG. 10 shows an embodiment of a computing system comprising the system according to FIG. 9.

DETAILED DESCRIPTION

In the context of this description, the following technical conventions, terms and/or expressions may be used:

The term 'machine-learning' may denote a core technology field in the area of artificial intelligence. Related systems work in a non-procedural way, i.e., decisions are not made on a fixed programming but via a self-programming based on examples. I.e., machine-learning systems learned its behavior based on provided samples and associates expected outcomes, often referred to as ground truth data. A machine-learning system may use specially designed hardware and during the training process with known data—in the case of a supervised learning—a machine-learning model is built. Several types of machine-learning systems and related models are known; one of these is a categorizing machine-learning model that classifies unknown input into a plurality—at least two—of classes or categories.

The term 'training data attack' may denote those data—specifically, samples and related labels as ground truth—which are used for the entire training of the machine-learning model. It is obvious that different training data would lead to different prediction results of the related machine-learning system. Hence, special attention should be given to the training data. However, intentional modifications of training data—particularly by an attacker—may lead to potentially mal-functioning machine-learning systems. This should be avoided. The proposed method and system is addressing this security threat.

The term 'initial training' may denote a training of the machine-learning model with training data for which it can be ensured that they are not malicious. These data may also be denoted as 'controlled training data'.

The term 'high-impact training data' may denote those training data which may result in comparably high loss function values during the learning process based on back-propagation. The comparatively high loss-function values during the training process may indicate that the related sample/label pairs unexpectedly divagate (significantly) from the other surrounding training data.

The term 'impact on a training cycle' may describe an unexpected impact on the training process which may be measurable as comparably high loss function values.

The term 'artificial pseudo-malicious training data set' may denote training data which have been generated as part of the training process, wherein these malicious training data have been generated under controlled conditions, e.g., by using a trained CatGAN.

The term 'categorical generative adversarial network system'—or CatGAN denotes a special version of a GAN (generator adversarial network) which is the class of machine-learning frameworks designed by Ian Goodfellow around 2014. Two networks contest with each other in a game—in the form of a zero-some game, where one of the agent's gain is another agent's loss. A GAN may have at least two core components: a generator and a discriminator, both being implemented as neural networks. The core idea of a GAN is based on the "indirect" training by the discriminator that can determine how "realistic" the more or less randomly generated input by the generator appears. Both, the generator and the discriminator are updated dynamically. In other words, the generator is not trained to minimize the distance to the specific image, but to fool the discriminator. If the discriminator can no longer distinguish between real data samples and artificially generated data samples, the training is finished.

In the following, a detailed description of the figures will be given. All instructions in the figures are schematic. Firstly, a block diagram of an embodiment of the inventive computer-implemented method or protecting a machine-learning model against training data attacks is given. Afterwards, further embodiments, as well as embodiments of the training system for protecting a machine-learning model against training data attacks will be described.

Before diving into the details of the different figures, a more general conceptual description should be given. The method considers a multi-dimensional machine-learning model with a classifier distinguishing K categories. The aim of the method is to harden the model in such a way that injections of malicious samples during further learning do not generate a larger model loss for any of the K categories.

The method identifies groups of samples which impact the models ability to classify input correctly, i.e., groups of samples which create a high ML model loss. Thereby, the ML model loss value is defined as the true label value (i.e., ground truth) minus the predicted label value. These samples are called adversarial samples.

By using a Categorial GAN (generated adversarial network), a large set of similar samples can be generated allowing a "vaccination" or 'immunization" of the model by a training under tempered conditions.

Thereby, the ML model training is divided in three phases: (i) an initial training; (ii) the immunization phase; (iii) the training also using a larger amount of public data. This will be described in the context of FIG. 3. Most of the inventive elements can be found in the interaction between the activities of the second phase. Here, one or more immunization cycles can be performed.

In the following, the term "sample" can be understood as a single sample or a group of samples (e.g., 100 samples) with similar characteristics. Thereby, the grouping of samples depends on the nature of the ML model.

FIG. 1 shows a block diagram of a preferred embodiment of the computer-implemented method 100 or protecting a machine-learning model against training data attacks. The method 100 comprises performing, 102, an initial training of a machine-learning system with controlled training data, i.e., data that for sure is not compromised. Thereby, a trained initial machine-learning model is built.

The method 100 also comprises identifying, 104, high-impact training data from a larger training data set than in the controlled training data. All of these data can also be considered as controlled and not compromised data. These identified individual training data affect a training cycle of the training of the machine-learning model that is greater than a predefined impact threshold value. More precise, the impact can be expressed by an abnormal high loss function value. From a practical perspective, the initially trained machine-learning model is frozen and one tries to add one (or more) additional training cycles using the high impact data. After each such additional training data cycle, one would step back to the frozen ML model in order to have a defined environment for the next cycle with high-impact data.

Additionally, the method 100 comprises building, 106, an artificial pseudo-malicious training data set from the identified high-impact training data, and retraining, 108, the machine-learning system comprising the trained initial machine-learning model using the artificial pseudo-malicious training data set.

FIG. 2 shows a diagram 200 of a learning curve with high-loss spikes that excessively perturb a trainable parameter distribution. The X-axis indicates the number of training iterations, whereas the Y-axis indicates the mean square error loss value of a loss function during a training cycle. As it turns out, the loss values decrease after a certain number of training cycles. It should also be noted that the shown learning curve is 2500 iteration boxcar average.

However, at around 90 iterations, at about 180 iterations and at about 300 iterations high spikes of loss-function values appear during training cycles for the training data. This indicates that the training data are heterogeneous. These training data having a high-impact—i.e., high loss-function values—and may impact the prediction behavior of the trained ML model if no content measure would be activated.

FIG. 3 shows a block diagram 300 of a three phase training approach for the ML model. As mentioned before, the ML model training is divided in three phases: The first phase 302 is an initial training that is performed using controlled, i.e., for sure non-malicious data. These data come from a validated source. The ML model created during this initial phase is fully functioning but may only have limited abilities—e.g., limited accuracy—due to unfinished training.

In the second phase 304, wherein vulnerabilities in the ML model are detected, samples are generated to close the vulnerabilities and purposeful training is applied to immunize the ML model against malicious training samples. In the third phase 306, the immunized ML model is trained with a large amount of publicly available data to develop the required capabilities, i.e., to finish the training.

FIG. 4 shows a block diagram of an embodiment of a first portion 400 of the immunization part of the training the ML model. It shall be noted that the first portion 400 is related to a first training cycle; subsequent training cycles are described in the context of FIG. 5.

As a first step 402 a set of non-malicious samples is provided. This can be done randomly or by grouping samples according to characteristics inherent in the nature of the ML model. The size of the sample can be varied over the immunization cycles.

In a next step 404, a copy of the current ML model is saved. Each sample (or each group of samples) is applied as training data to the model. The mean square error (MSE)—when applying the sample—is measured and recorded. The ML model is then modified, i.e., only for which propagation it is applied (back propagation would be needed to adapt the model to the error, but it is not applied here). The following stopping condition or combination of these can be applied: (i) all samples of the sample set have been applied; (ii) if predefined amount of computing time has been spent; (iii) a sufficient number of samples causing a high error loss are identified, i.e. found to be "malicious".

Finally, the samples are filtered using the measured MSE. All samples with an MSE greater than a predefined threshold (which could also be relative to the maximum measured MSE) are defined as malignant and subject to the following steps.

Optionally, the sample set provided by step 402 can be altered or augmented, 406. For instance, samples are added from the pool that (i) have similar characteristics to the samples identified as malicious are added to the set; (ii) are in the same category as the samples identified as malicious; (iii) are in a category where some samples have been identified as malicious.

If not a sufficient number of malicious samples has been found, 408 (sufficient number of separate identified?), the immunization phase is completed and the process continues with phase 3. In this context, "not a sufficient amount" means, e.g., (i) that the model is considered as stable enough to perform even one training with malicious samples in phase 3, and/or (ii) the CatGAN cannot be trained in a meaningful way with the identified malicious samples.

Then, a CatGAN 1 is created, 410, with the identified malicious samples. The generator component of the CatGAN is used to create a large set of artificial samples, 412, which contain (more or less) the malicious effect when applied as training data, i.e., generating comparably high spikes/peaks in the learning curve (compare, e.g., FIG. 2). Each artificial sample (or each group of artificial samples) forward pass is applied; and the mean square error, when applying the sample, is measured and recorded as in step 414, and the model is not modified.

Next, the artificially generated samples are sorted ascendingly, 416, according to the error loss measurement. The artificial samples are applied, 418, as training data to the ML model. Thus, the ML model is modified by the training.

Also, the following is considered when applying the training: (i) a minimum clip level for the mean square error loss value can be applied, i.e., samples which cause no or only a small error loss can be skipped as the immunization impact may be irrelevant; (ii) the samples are applied in order of ascending error loss-function values observed; (iii) a maximum clip level for the mean square error loss value can be applied, i.e., samples that actually do harm are not applied as training data (at least not in this immunization cycle); (iv) optionally, the samples above the clip (i.e, threshold value) are added to an overall sample pool for subsequent iterations. Doing so focuses the method on the hardening of the detected vulnerabilities; however, it limits the ability to identify further weaknesses in the ML model.

The result of this activity is an immunized ML model, 420, and optionally an addition (of samples) to the overall sample pool to be used for the next immunization cycle (according to the stopping condition).

Once the immunization cycle is completed, phase 2 continues with the next immunization cycle to complete phase 2, the following stopping conditions or combination of those can be applied: (i) all samples of the sample pool have been applied; (ii) a predefined amount of computing time has been spent; (iii) if a predefined number of immunization cycles has been performed; (iv) the samples which were excluded during an earlier immunization cycle in the activity 418 are applied for measuring the MSE loss, if the observed error is below a predefined threshold value, the model is regarded as immunized; (v) the stopping condition in the activity 408—i.e. too few samples regarded as being malicious—has been met.

After the model is immunized in phase 2 of the immunization, the training for functional improvement can start utilizing the large pool of public data, i.e., which may include malicious data provided by adversaries. However, this will no longer have a negative effect.

FIG. 5 shows a block diagram of an embodiment of a second portion 500 of the immunization part of the training the training. The reader will notify that the layout of the flowchart is almost the same if compared to FIG. 4. However, there are some differences between the first training cycle and subsequent training cycles. This is indicated with an N or N−1 in the respective activity boxes. This applies mainly to 502, 504, 506, 510, 512, 514, 518 and 520. Unchanged instructions apply to activity box 508 and 516. In general, the flowchart of FIG. 5 shall be seen in the context of training cycle capital N. If the immunization of the ML model in cycle N is completed, 520, the next cycle, namely cycle N+1, is performed. The stop condition is checked in activity 508, whether a sufficient number of samples has been identified, or, in other words, whether enough training cycles have been applied.

After the ML model is immunized in the just described phase 2, training for functional improvements can start utilizing a large pool of publicly available data, i.e., which may include unknown malicious data provided by adversaries.

FIG. 6 shows a block diagram 600 of an embodiment for generating tempered training samples using a CatGAN, i.e., a type of curation of artificial samples in each immunization cycle. The top rectangle in the figure shows the different components of the data samples: the controlled and secured data for the initial training in phase 1 is indicated by 602; the sample pool for the ML model immunization is referred to by 604; and the data required for the complete dating—i.e., all data—are referred to by reference numeral 606.

The initial data set for the training of phase 1—i.e., the initial training—is used to derive/train the ML model for K different categories. This provides the base model M. The lower part of the figure shows the cure ration of adverse serial samples to immunize the ML model.

Firstly, a pool of samples is taken, 608, 610. The samples are categorized by the classifier which has K categories denoted with k=1, . . . , K. When using neural networks as an ML model, the last layer of network nodes of the classifier is typically a soft-max layer that allows logits for each class to be translated into the predicted class with the essential property of being differentiable.

Exemplary, in the figure, three categories are shown (but it may also be dozens or hundreds). It may also be noticed that the activities 608, 610 related to the sample set are related to steps 402, 404, 406 and 408 of FIG. 4.

Also shown is the mean error loss value—when applying a sample—as vertical line related to a sample which is indicated by a circle. Reference numeral 612 refers to the used error loss threshold value. It can be seen that some of the samples produce a mean square error loss value below the error loss threshold value 612 and other samples produce a mean square error loss value above the error loss threshold value 612.

By applying a predefined threshold value, the samples causing an ML model loss value above the threshold value during the training phase are separated. They constitute the set of adversarial samples $A1=\{(sample, logit of class_1, . . . , logit of class_k, . . . \}$. It can easily be seen, that those samples producing a mean square error loss value above the threshold value are shown as white circles, while the other ones are shown as filled black circles (those that stay below the error loss threshold value).

The result of the steps 410 and 412 of FIG. 4 is in the respective sample set $A_1$ of data with all white circles 614. Based on these high-impact samples 614, and using a CatGAN system, a generation 616 of new high-impact samples $A^*_1$ 618 is performed. Also here, when applying the samples to the ML model for training, mean square error loss values are determined and compared to the error loss threshold value 612 (here, another value for the error loss threshold value may be used if compare to the steps before). This activity is related to 414 of FIG. 4.

Next, the samples are sorted according to an ascending order—compare activity 416 of FIG. 4. Now, these values 620 are used in an ascending order for the re-training of the already trained ML model. Especially the chosen option to apply the samples—which actually relate to mixed categories of the categorization of the ML model—makes the ML model immune to malicious training data values.

After this immunization of the ML model, the ML model may be further trained using all data 606 to complete the training of the ML model. However, now, the ML model is no longer over-sensitive or sensitive at all to malicious training data.

FIG. 7 shows a diagram 700 usage of a CatGAN for a sample creation. A K-dimensional CatGAN 702 (generative adversarial network) using the samples $A_1$ is created (compare 410, 412 of FIGS. 4 and 616 of FIG. 6). A CatGAN allows semi-supervised learning using labeled examples 704 comprising a discriminator D 706 and a generator G 712. Once the CatGAN model is built based on the used training samples, the method and system proposed here uses the generator of the CatGAN to produce labeled samples that are similar to the set of adversarial samples $A_1$ which have been identified earlier in activity 404 of FIG. 4.

The adversarial samples $A_1$ identified as just described are fed to the GAN. During the process, the value function V(D,G) is minimized for G and maximized for D so that ideally, the discriminator D 706 can only state with 50% probability whether the current input is a real sample are a synthetic sample (from a random code base 710) produced by the generator G 712. Hence, the discriminator D 706 is no longer able to distinguish between real and artificially created samples.

Whilst the function by P(A) provides the statement "is real" versus "is fake", the probability function P(k,A) 708 provides a probability that certain samples belong to category k. Similar to adversarial process generating fake samples 714 and discriminating better between real and fake, the generator G 712 aims for an evenly distributed result of P(k,A)—meaning that each P(k,A) for k=1, . . . K has the same value P(k·A)=1/K–the discriminator D 706 aims to have P(k,A) for 1 k close to 1, where it's for all other categories P(k,A) is close to zero.

One or a combination of these stopping conditions is used to terminate the generation of synthetic code 714, i.e., artificial malicious samples.

a) The probability function is close to 0.5: |P(k·A)–0.5|<δ (e.g., δ=0.01) on average across categories.

b) The probability function is close to 0.5: |P(k·A)–0.5|<$\delta_k$, (e.g., $\delta_k$=0.02) for each subset of categories.

c) The probability function P(k,A)>α for one category and P(k,A)<β for all the other categories, i.e., that with a sufficient certainty, the input code can be classified correctly. For instance α=0.9 and, β=0.1, for each category j=1, . . . , K: P(k,A)>α for k=j and P(k,A)<β for k≠j.

Either α, β can be defined across categories or $\alpha_k$, $\beta_k$ can be defined individually for categories paying attention to the fact that the range and number of samples varies across categories.

d) The generator neural network has reached a predefined size.

e) A predefined number of iterations (sample generated, sample discriminated) were performed.

f) A predefined amount of computing time has been spent.

After the predefined stopping condition is met, the CatGAN generator $G_1$ (which generates samples similar to the samples in $A_1$) is ready to be used.

The generator G of the CatGAN can produce a large set of synthetical adversarial samples $A^*_1$ distributed evenly over the categories. The distribution of artificial samples in $A^*_1$ can be analyzed in terms of P(k, $A_1$) by the discriminator D, which is shown in the diagram above for k=1 and k=2.

Method step 514 of phase 2

However, the discriminator cannot provide any value about the error loss of the model caused by an artificial sample. The only way to analyze an artificial sample (or group of samples) is to apply it as training data to the model.

The samples of $A^*_1$ are forward-passed to the base model M. As in step b), this provides the model loss value per classifier for each sample in $A^*_1$.

Method step 516 of phase 2

The samples of $A^*_1$ are sorted by model loss values ascendingly (from low loss to high loss). Optionally a lower clip level (not shown in the diagram) and an upper clip level for the measured error loss value can be applied, as described in method step 516.

In the final method step 518, the (remaining) samples of $A^*_1$ are applied to the model in the order defined in the related phase-2-training step.

FIG. 8 shows an exemplary distribution 800 of artificial samples distributed over the plurality of categories. The axis' are used for the following categories: X-axis: probability for samples being in category k=1; Y-axis: probability for samples being in category k=2; Z-axis: frequency of samples produced by generator G. The figure shows in a nice way that the proposed method shall work as designed because of the equal distribution of the samples in selected categories.

FIG. 9 shows a block diagram of an embodiment of the training system 900 for protecting a machine-learning model against training data attacks. The system 900 comprises a processor 902 and a memory 904 operationally coupled to the processor 902, wherein the memory 904 is adapted for storing program code, which, wherein executed by the processor 902, enables the processor 902 to perform—in particular by an initial training unit 906—an initial training of a machine-learning system with controlled training data, thereby building a trained initial machine-learning model and to identify—in particular, by an identification system 908—high-impact training data from a larger training data set than in the controlled training data, wherein the identified individual training data have an impact on a training cycle of the training of the machine-learning model, wherein the impact is larger than a predefined impact threshold value.

The system 900 is also enabled to build—in particular by a construction unit 910—an artificial pseudo-malicious training data set from the identified high-impact training data and to retraining—by a retraining unit 912—the machine-learning system comprising the trained initial machine-learning model using the artificial pseudo-malicious training data set.

It shall also be mentioned that all functional units, modules and functional blocks—in particular, the processor 902, the memory 904, the initial training unit 906, identification system 908, the construction unit 910 and the retraining unit 912—may be communicatively coupled to each other for signal or message exchange in a selected 1:1 manner. Alternatively, the functional units, modules and functional blocks can be linked to a system internal bus system 914 for a selective signal or message exchange.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read—only memory (ROM), erasable programmable read-only memory (EPROM or Flash memory), static random access memory (SRAM), compact disc read—only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 10 shows a computing environment 1000 comprising an example of an environment for the execution of at least some of the computer code involved in performing the inventive methods, such as the computer-implemented method or protecting a machine-learning model against training data attacks 900.

In addition to block 1050, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1050, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1050 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 1050 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms, discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

It should also be mentioned that the training system 900 for protecting a machine-learning model against training data attacks can be an operational sub-system of the computer 1001 and may be attached to a computer-internal bus system.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Finally, the inventive concept can be summarized by the following clauses:

1. A computer-implemented method for protecting a machine-learning model against training data attacks, the method comprising performing an initial training of a machine-learning system with controlled training data, thereby building a trained initial machine-learning model, identifying high-impact training data from a larger training data set than in the controlled training data, wherein the identified individual training data have an impact on a training cycle of the training of the machine-learning model, wherein the impact is larger than a predefined impact threshold value, building an artificial pseudo-malicious training data set from the identified high-impact training data, and retraining the machine-learning system comprising the trained initial machine-learning model using the artificial pseudo-malicious training data set.

2. The method according to clause 1, also comprising extending the training data set to publicly available data, and retrain the machine-learning system comprising the trained initial machine-learning model using the extended training data set.

3. The method according to clause 2, wherein the retrained machine-learning model having used publicly available data for the retraining is used for autonomous driving.

4. The method according to any of the preceding clauses, also comprising extending the artificial pseudo-malicious training data set by using a categorical generative adversarial network system CatGAN comprising a generator component and a discriminator component, wherein the categorical generative adversarial network has been trained with the artificial pseudo-malicious training data set for generating additional artificial pseudo-malicious training data.

5. The method according to clause 4, wherein the machine-learning model is a categorizing machine-learning model adapted to predict that unknown data belong to one of a plurality of categories.

6. The method according to clause 5, wherein the discriminator component of the CatGAN system has been trained to predict malicious samples for the artificial pseudo-malicious training data set, wherein the predicted malicious samples are evenly distributed across the plurality of categories.

7. The method according to any of the preceding clauses, wherein the impact on a training cycle of the training of machine-learning model is determined based on an amount value of a utilized training loss function for the training of the machine-learning model.

8. The method according to any of the preceding clauses, wherein the high-impact training data is obtained by sorting samples based on their mean square error.

9. The method according to any of the preceding clauses, wherein the controlled training data and the larger training data set are un-checked with regard them being compromised.

10. A training system for protecting a machine-learning model against training data attacks, the system comprising a processor and a memory operationally coupled to the processor, wherein the memory is adapted for storing program code, which, wherein executed by the processor, enables the processor to perform an initial training of a machine-learning system with controlled training data, thereby building a trained initial machine-learning model, identify high-impact training data from a larger training data set than in the controlled training data, wherein the identified individual training data have an impact on a training cycle of the training of the machine-learning model, wherein the impact is larger than a predefined impact threshold value, build an artificial pseudo-malicious training data set from the identified high-impact training data, and retrain the machine-learning system comprising the trained initial machine-learning model using the artificial pseudo-malicious training data set.

11. The system according to clause 10, also comprising extending the training data set to publicly available data, and retrain the machine-learning system comprising the trained initial machine-learning model using the extended training data set.

12. The system according to clause 11, wherein the retrained machine-learning model having used publicly available data for the retraining is used for autonomous driving.

13. The system according to any of the clauses 10 to 12, also comprising extending the artificial pseudo-malicious training data set by using a categorical generative adversarial network comprising a generator component and a discriminator component, wherein the categorical generative adversarial network has been trained with the artificial pseudo-malicious training data set for generating additional artificial pseudo-malicious training data.

14. The system according to clause 13, wherein the machine-learning model is a categorizing machine-learning model adapted to predict that unknown data belong to one of a plurality of categories.

15. The system according to clause 14, wherein the discriminator component of the CatGAN has been trained to predict malicious samples for the artificial pseudo-malicious training data set, wherein the predicted malicious samples are evenly distributed across the plurality of categories.

16. The system according to any of the clauses 10 to 15, wherein the impact on a training cycle of the training of machine-learning model is determined based on an amount value of a utilized training loss function for the training of the machine-learning model.

17. The system according to any of the clauses 10 to 16, wherein the high-impact training data is obtained by sorting samples based on their mean square error.

18. The system according to any of the clauses 10 to 17, wherein the controlled training data and the larger training data set are un-checked with regard them being compromised.

19. A computer program product for protecting a machine-learning model against training data attacks, the computer program product comprising a computer readable storage medium having program instructions embodied therewith, the program instructions being executable by one or more computing systems or controllers to cause the one or more computing systems to perform an initial training of a machine-learning system with controlled training data, thereby building a trained initial machine-learning model, identify high-impact training data from a larger training data set than in the controlled training data, wherein the identified individual training data have an impact on a training cycle of the training of machine-learning model, wherein the impact is larger than a predefined impact threshold value, build an artificial pseudo-malicious training data set from the identified high-impact training data, and retrain the machine-learning system comprising the trained initial machine-learning model using the artificial pseudo-malicious training data set.

What is claimed is:

1. A computer-implemented method for protecting a machine-learning model against training data attacks, said method comprising:

performing an initial training of a machine-learning system with a controlled training data set, thereby building a trained initial machine-learning model;

identifying high-impact training data from a larger training data set than in said controlled training data set, wherein said identified high-impact training data have an impact on a training cycle of said training of the machine-learning model, wherein said impact is larger than a predefined impact threshold value;

adding, to the high-impact training data from the larger training data set, malicious data identified as being at least one of similar in characteristic to or in a same category as the high-impact training data;

building an artificial pseudo-malicious training data set from said identified high-impact training data that is sorted ascendingly based on the impact on the training cycle; and retraining said machine-learning system comprising said trained initial machine-learning model using said ascendingly sorted artificial pseudo-malicious training data set, wherein the retraining said machine-learning system is performed until an observed error of one or more samples of the controlled training data set that were excluded during the initial training of the machine-learning system is below a threshold mean squared error loss.

2. The method according to claim 1, also comprising:

extending said larger training data set to publicly available data, and retrain said machine-learning system comprising said trained initial machine-learning model using said extended larger training data set.

3. The method according to claim 2, wherein said retrained machine-learning model having used publicly available data for said retraining is used for autonomous driving.

4. The method according to claim 3, also comprising:

extending said artificial pseudo-malicious training data set by using a categorical generative adversarial network (CatGAN) system comprising a generator component and a discriminator component, wherein said categorical generative adversarial network has been trained with said artificial pseudo-malicious training data set for generating additional artificial pseudo-malicious training data.

5. The method according to claim 4, wherein said machine-learning model is a categorizing machine-learning model adapted to predict that unknown data belong to one of a plurality of categories.

6. The method according to claim 5, wherein said discriminator component of said CatGAN system has been trained to predict malicious samples for said artificial pseudo-malicious training data set, wherein said predicted malicious samples are evenly distributed across said plurality of categories.

7. The method according to claim 6, wherein said impact on a training cycle of said training of machine-learning model is determined based on an amount value of a utilized training loss function for said training of said machine-learning model.

8. The method according to claim 7, wherein said high-impact training data is obtained by sorting samples based on their mean square error.

9. The method according to claim 8, wherein said controlled training data set and said larger training data set are un-checked with regard to them being compromised.

10. A training system for protecting a machine-learning model against training data attacks, said system comprising:

a processor and a memory operationally coupled to said processor, wherein said memory is adapted for storing program code, which, wherein executed by said processor, enables said processor to:

perform an initial training of a machine-learning system with a controlled training data set, thereby building a trained initial machine-learning model;

identify high-impact training data from a larger training data set than in said controlled training data set, wherein said identified high-impact training data have an impact on a training cycle of said training of the machine-learning model, wherein said impact is larger than a predefined impact threshold value;

adding, to the high-impact training data from the larger training data set, malicious data identified as being at least one of similar in characteristic to or in a same category as the high-impact training data;

build an artificial pseudo-malicious training data set from said identified high-impact training data that is sorted ascendingly based on the impact on the training cycle; and retrain said machine-learning system comprising said trained initial machine-learning model using said ascendingly sorted artificial pseudo-malicious training data set, wherein the retraining said machine-learning system is performed until an observed error of one or more samples of the controlled training data set that were excluded during the initial training of the machine-learning system is below a threshold mean squared error loss.

11. The system according to claim 10, also comprising: extending said larger training data set to publicly available data, and retrain said machine-learning system comprising said trained initial machine-learning model using said extended larger training data set.

12. The system according to claim 11, wherein said retrained machine-learning model having used publicly available data for said retraining is used for autonomous driving.

13. The system according to claim 12, also comprising: extending said artificial pseudo-malicious training data set by using a categorical generative adversarial network (CatGAN) system comprising a generator component and a discriminator component, wherein said categorical generative adversarial network has been trained with said artificial pseudo-malicious training data set for generating additional artificial pseudo-malicious training data.

14. The system according to claim 13, wherein said machine-learning model is a categorizing machine-learning model adapted to predict that unknown data belong to one of a plurality of categories.

15. The system according to claim 14, wherein said discriminator component of said CatGAN has been trained to predict malicious samples for said artificial pseudo-malicious training data set, wherein said predicted malicious samples are evenly distributed across said plurality of categories.

16. The system according to claim 15, wherein said impact on a training cycle of said training of machine-learning model is determined based on an amount value of a utilized training loss function for said training of said machine-learning model.

17. The system according to claim 16, wherein said high-impact training data is obtained by sorting samples based on their mean square error.

18. The system according to claim 17, wherein said controlled training data set and said larger training data set are un-checked with regard them being compromised.

19. A computer program product for protecting a machine-learning model against training data attacks, said computer program product comprising a computer readable storage medium having program instructions embodied therewith, said program instructions being executable by one or more computing systems or controllers to cause said one or more computing systems to:

perform an initial training of a machine-learning system with a controlled training data set, thereby building a trained initial machine-learning model;

identify high-impact training data from a larger training data set than in said controlled training data set, wherein said identified high-impact training data have an impact on a training cycle of said training of machine-learning model, wherein said impact is larger than a predefined impact threshold value;

adding, to the high-impact training data from the larger training data set, malicious data identified as being at least one of similar in characteristic to or in a same category as the high-impact training data;

building an artificial pseudo-malicious training data set from said identified high-impact training data that is sorted ascendingly based on the impact on the training cycle; and retraining said machine-learning system comprising said trained initial machine-learning model using said ascendingly sorted artificial pseudo-malicious training data set, wherein the retraining said machine-learning system is performed until an observed error of one or more samples of the controlled training data set that were excluded during the initial training of the machine-learning system is below a threshold mean squared error loss.

* * * * *